(12) United States Patent
Salonen

(10) Patent No.: US 11,329,386 B2
(45) Date of Patent: May 10, 2022

(54) DEVICE FOR RECEIVING AND RE-RADIATING ELECTROMAGNETIC SIGNAL

(71) Applicant: Antennium Oy, Espoo (FI)

(72) Inventor: Erkki Tapio Salonen, Espoo (FI)

(*) Notice: Subject to any disclaimer, the term of this patent is extended or adjusted under 35 U.S.C. 154(b) by 24 days.

(21) Appl. No.: 16/959,675

(22) PCT Filed: Jan. 4, 2019

(86) PCT No.: PCT/FI2019/050006
§ 371 (c)(1),
(2) Date: Jul. 2, 2020

(87) PCT Pub. No.: WO2019/135029
PCT Pub. Date: Jul. 11, 2019

(65) Prior Publication Data
US 2021/0083393 A1    Mar. 18, 2021

(30) Foreign Application Priority Data

Jan. 5, 2018  (FI) ..................................... 20187002

(51) Int. Cl.
*H01Q 13/08* (2006.01)
*H01Q 1/00* (2006.01)
(Continued)

(52) U.S. Cl.
CPC ........... *H01Q 13/085* (2013.01); *H01Q 1/007* (2013.01); *H01Q 25/005* (2013.01); *H04B 7/145* (2013.01)

(58) Field of Classification Search
CPC ..... H01Q 13/085; H01Q 25/005; H04B 7/145
See application file for complete search history.

(56) References Cited

U.S. PATENT DOCUMENTS

| 4,001,834 A * | 1/1977 | Smith | ................... H01Q 13/08 343/754 |
| 6,292,153 B1 * | 9/2001 | Aiello | ...................... H01Q 1/36 343/767 |

(Continued)

FOREIGN PATENT DOCUMENTS

WO    WO-2016027007 A1 *  2/2016   ............. H01Q 1/007

OTHER PUBLICATIONS

Gijo Augustin et al.: "An Integrated Ultra Wideband/Narrow Band Antenna in Uniplanar Configuration for Cognitive Radio Systems", IEEE Transactions on Antennas and Propogartion, Jul. 10, 2012, pp. 5479-5484, DOI: 10.1109/TAP.2012.2207688 (Year: 2012).*

*Primary Examiner* — Andrea Lindgren Baltzell
*Assistant Examiner* — Amal Patel

(57) ABSTRACT

The invention comprises a device for receiving electromagnetic signal and radiating the signal further. With that device the signal can be repeated on the other side of a barrier, for example a wall, which prevents the signal to propagate.
The receiving section (1) of the device has been made as a planar aperture antenna, as well as the re-radiating section (2). The above-mentioned planar aperture antenna has been made so that between the antenna parts of conductive material (6) there is an opening (7) which opens in the propagation direction of the signal (4 and 5).
Between the above-mentioned receiving section (1) and the re-radiating section (2) there is a signal transmission section (3) which has been implemented as two parallel conductors (8) with a gap (9). The transitions between the receiving section (1), the signal transmission section (3) and the re-radiating section (2) have been realized in stepless manner without separate connectors.

12 Claims, 8 Drawing Sheets

Figure 1:
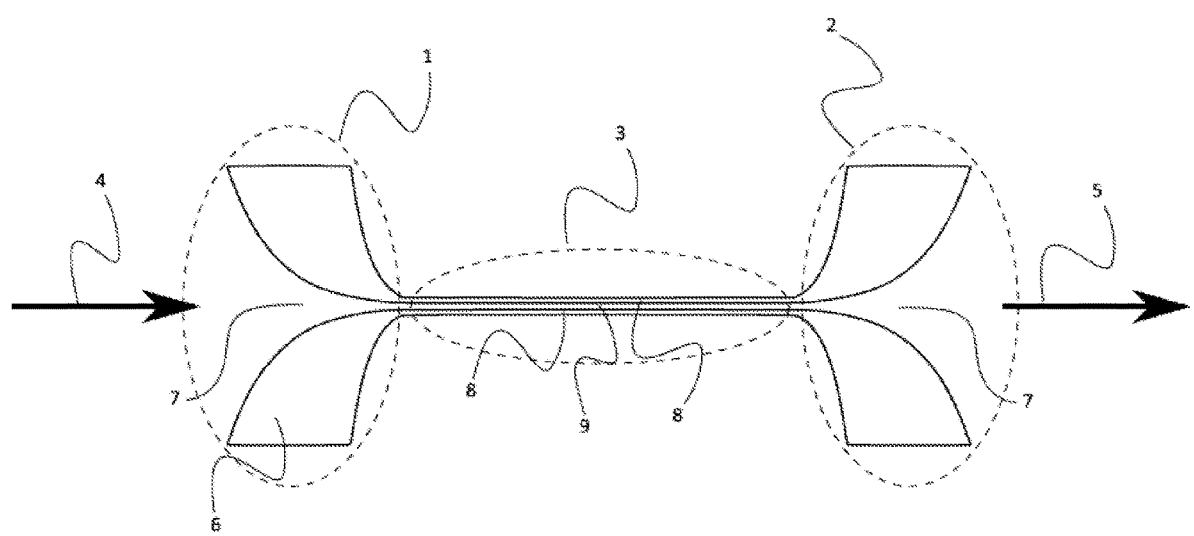

(51) Int. Cl.
 *H04B 7/145* (2006.01)
 *H01Q 25/00* (2006.01)

(56) References Cited

U.S. PATENT DOCUMENTS

| | | | |
|---|---|---|---|
| 7,009,572 B1 * | 3/2006 | Homer | H01Q 13/085 |
| | | | 343/767 |
| 2010/0171673 A1 * | 7/2010 | Guy | H01Q 15/06 |
| | | | 343/753 |
| 2017/0040711 A1 * | 2/2017 | Rakib | H01Q 25/001 |
| 2017/0256861 A1 * | 9/2017 | Emmanuel | H04B 7/145 |

* cited by examiner

DEVICE FOR RECEIVING AND RE-RADIATING ELECTROMAGNETIC SIGNAL

The invention comprises a device for receiving and re-radiating an electromagnetic signal. With that device the signal can be repeated on the other side of a barrier, for example a wall, which prevents the signal to propagate.

Energy consumption in buildings plays a major role in total energy consumption especially in cold climates such as Finland. Due to increasing energy efficiency requirements, the capabilities of thermal insulation of new buildings are enhanced and the goal is to achieve zero-energy buildings.

New building materials such as energy-efficient conductive-coated windows (selective glazing) and polyurethane thermal insulating boards coated by aluminum foil significantly attenuate the transmission of the radio signal, particularly at commonly used mobile frequencies (900 MHz to 2100 MHz). For example, at a frequency of 2100 MHz, the measurement values of the penetration attenuation of both aluminum-coated thermal insulation boards and selective windows are up to 40 dB, i.e. the signal level attenuates 10,000 parts of the original (Tampere University of Technology, Radio Signal Attenuation Measurements in Modern Residential Houses (in Finnish), Final Report 2012).

At mobile frequencies, radio waves penetrate from outside to inside or vice versa, mainly through windows, if the walls are concrete or aluminum foil coated thermal insulation boards are used. The windows with metal oxide-coated glasses are used to prevent heat losses in new energy efficient buildings, but unfortunately, they prevent also the radio wave penetration through the window glass. Because of that the mobile phone coverage problems are common in new energy-efficient houses.

Mobile operators can improve reception by building more dense base station network and building base stations within large buildings, but the costs are very high.

Active amplifier-equipped repeater devices interfere with network control and because of that they are not accepted by operators for the frequency bands they manage.

Current technology has been described in following publications:
US 2003021407740
US 74029953
DE 102014020404095
FI 12694040
US 200201197408
FI 10682

The low-cost broadband solution has not previously been presented to the problem of the cellular network coverage indoors of new energy efficient houses.

This invention includes a passive wideband repeater antenna structure to be mounted, for example, in a window structure, and an antenna array consisting of them. Antenna solution improves the penetration of radio waves indoors over a wide frequency range, thereby improving current and future mobile communications, especially in energy efficient buildings. The antenna structure of the invention can be integrated, for example, in window structures or mounted in a window frame.

One solution of the invention is to direct signal to the shadow areas, for example around the corner. This problem becomes more important at higher frequencies meaning also shorter wavelengths. For example, future wireless LANs are predicted to use wavelengths that signals do not propagate from room to room without any auxiliary devices.

The passive repeater antenna system can be implemented by connecting a coaxial cable between two antennas. The problem with such a solution is that the matching from an antenna to e.g. a 50 ohm coaxial cable is difficult to get broadband. In addition, the connectors and connecting cables increase the cost of the structure.

The problem with repeater antenna solutions based on resonance-type structures is that, for example, new frequency bands coming during a building's life cycle cannot be taken into account at the design stage. The broadband solution presented here is more likely also useful for future frequency bands.

Figure 2:
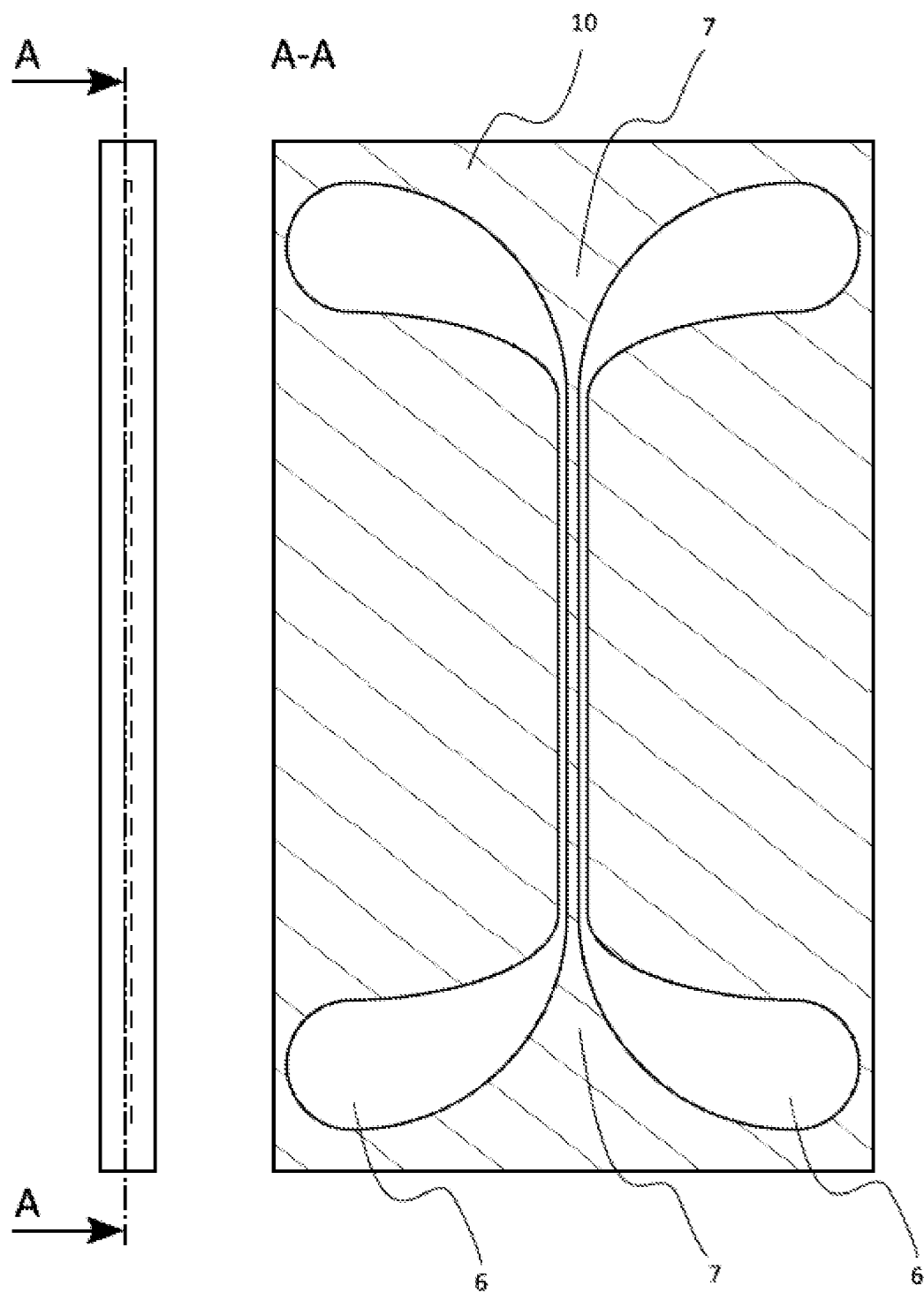
Figure 3:
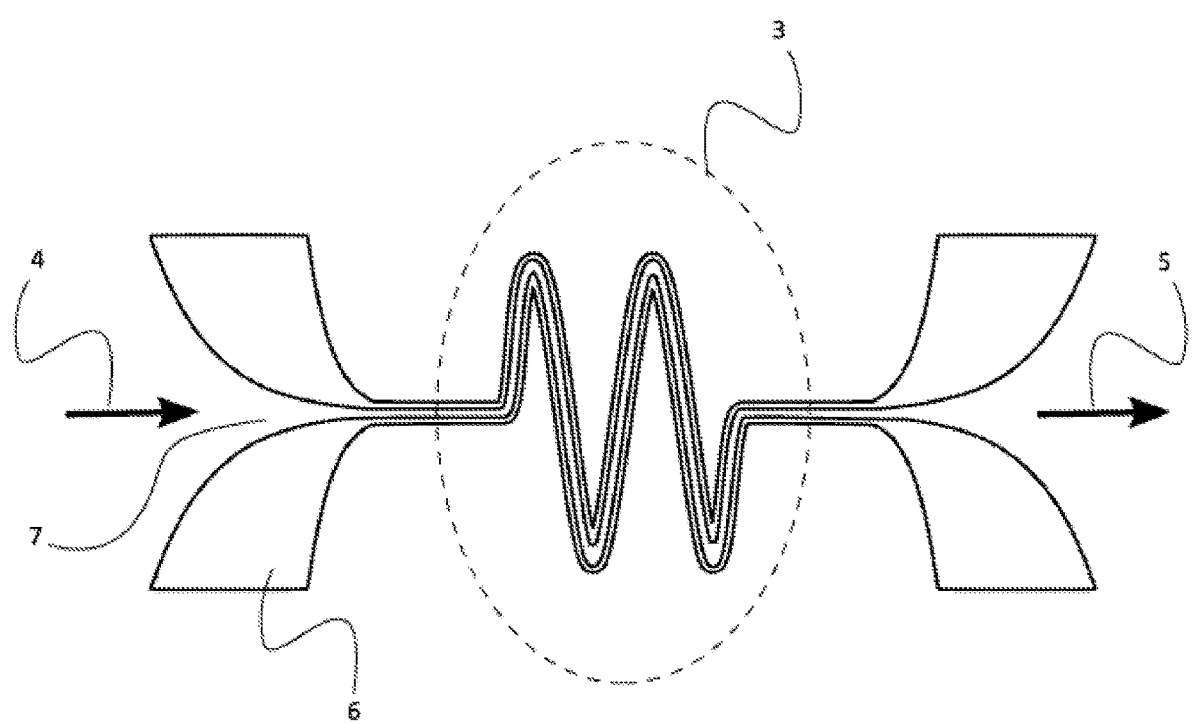
Figure 4:
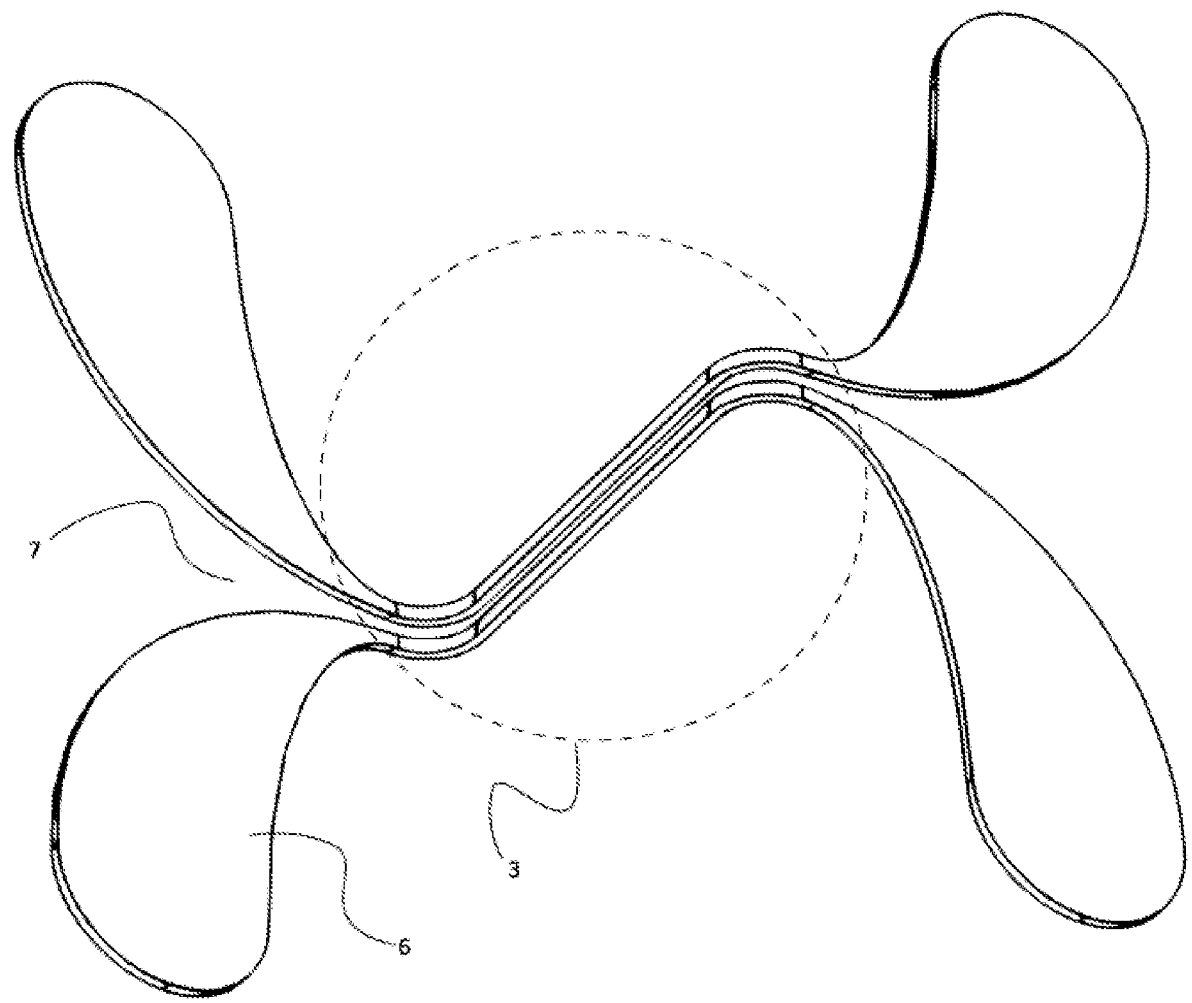
Figure 5:
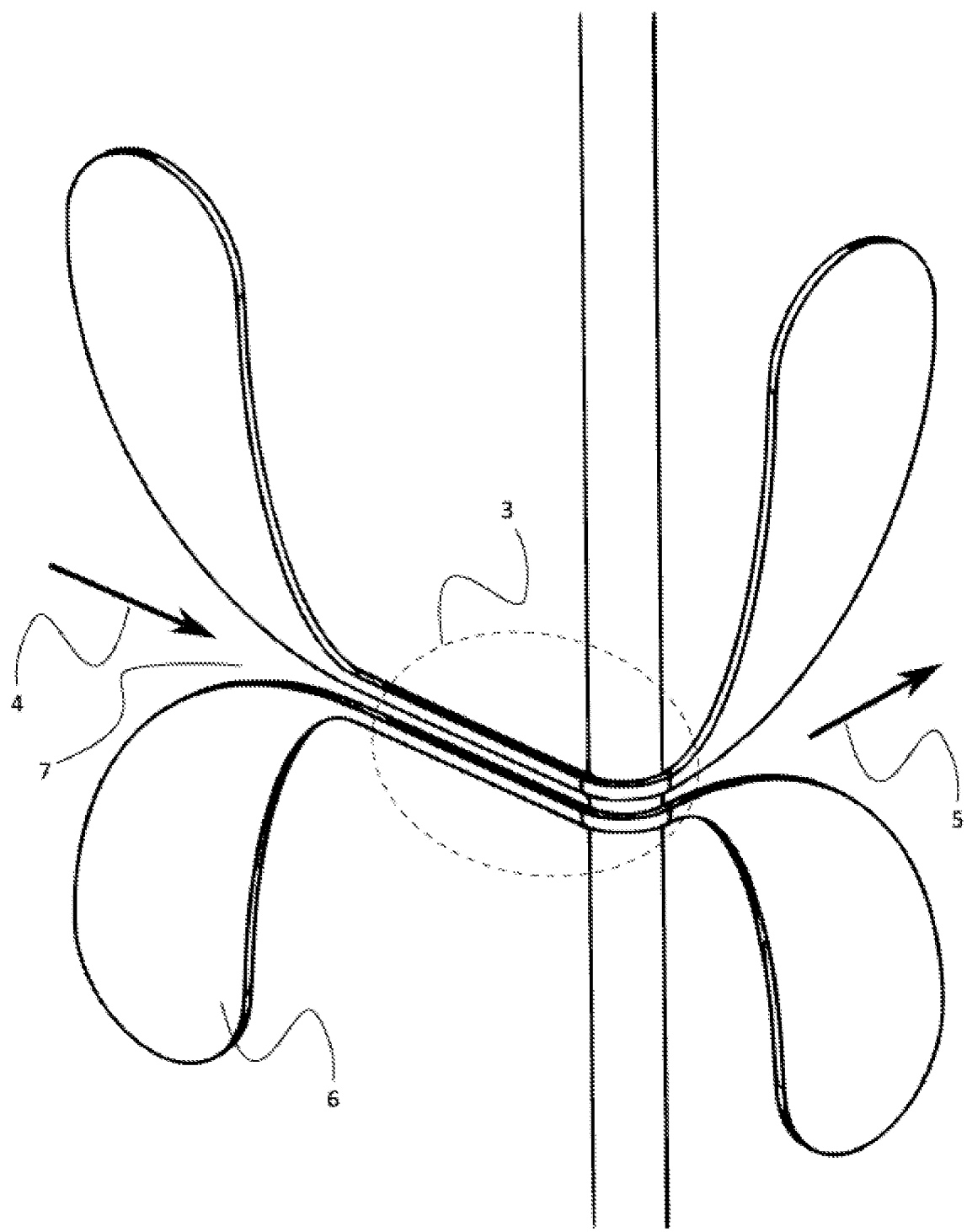
Figure 6:
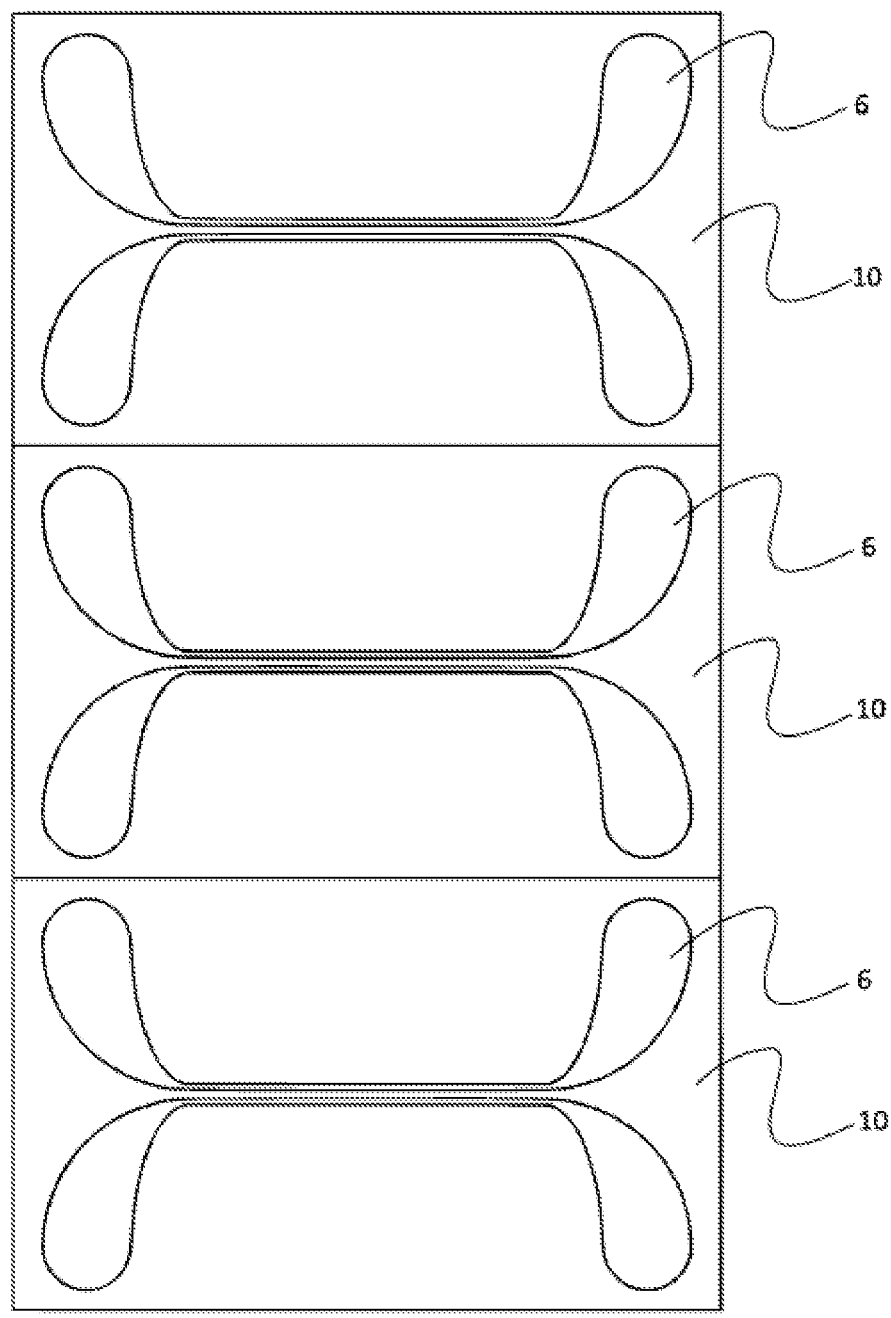
Figure 7:
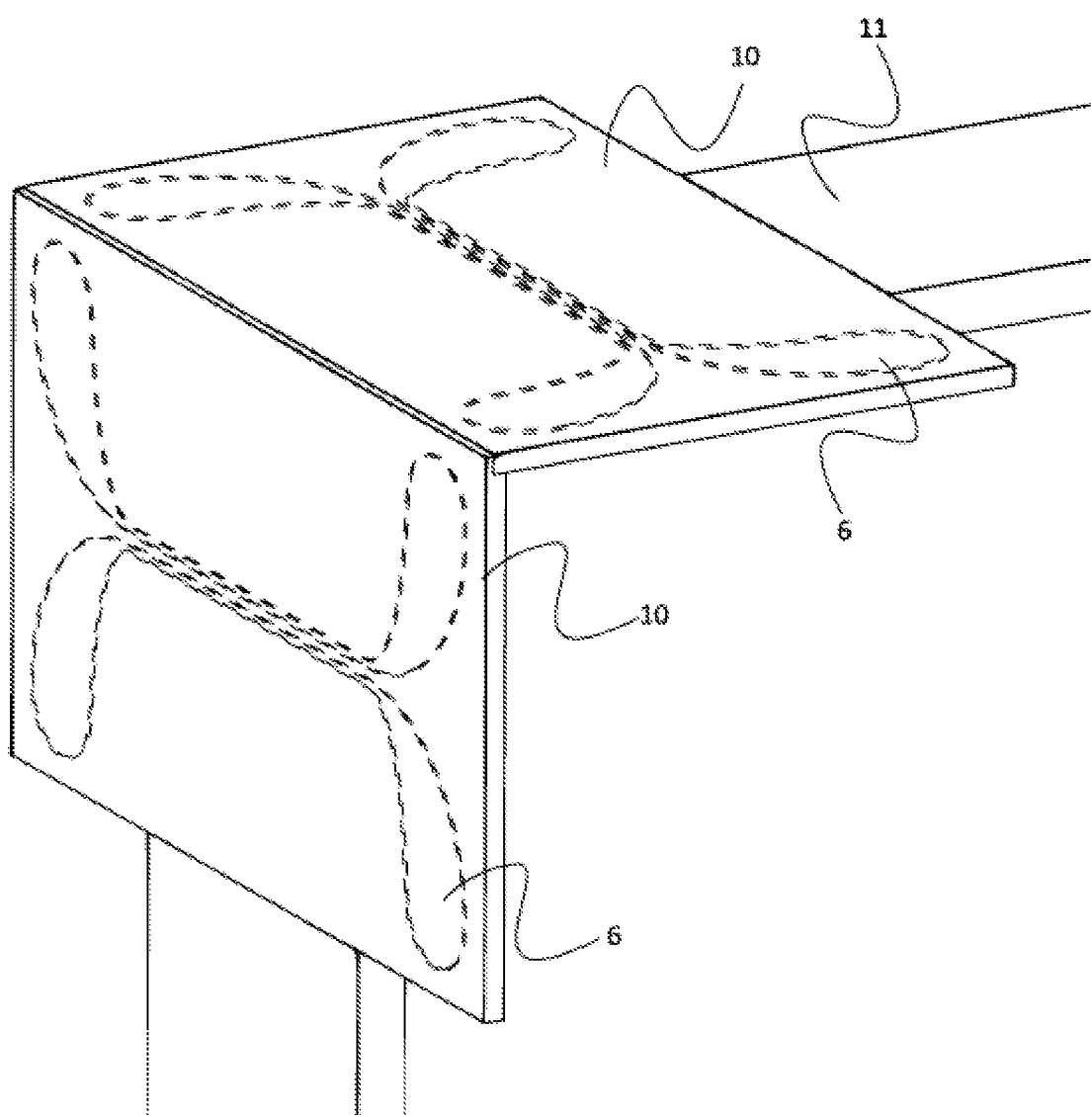
Figure 8:
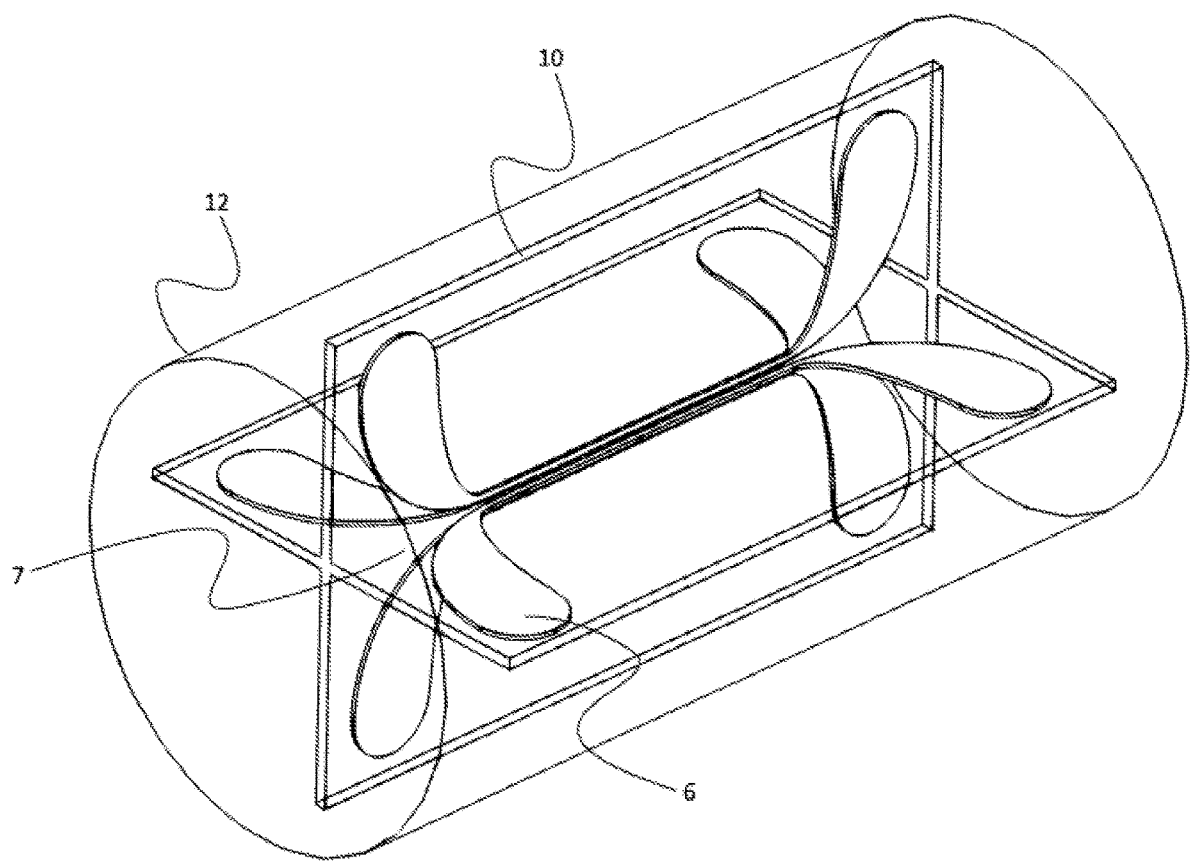

In the following, the invention will be described with reference to the accompanying drawings, in which:

FIG. 1 shows the principle of operation of the invention and a general embodiment FIG. 2 shows an embodiment of the invention in front and in cross-section FIG. 3 shows another embodiment of the invention FIGS. 4 and 5 show a third embodiment of the invention in various applications FIG. 6 shows an antenna array implemented by the devices according to the invention FIG. 7 shows an arrangement of the devices according to the invention FIG. 8 shows an another arrangement of the devices according to the invention FIG. 1 shows the operation principle of the invention. The incoming signal (4) is received by the signal receiver section (1), transmitted through the barrier by transmission section (3), and repeated (5) by the re-radiating section (2). If the transmission distance is short in the barrier, the actual signal transmission section (3) is not necessary.

FIG. 1 also shows a general embodiment of the invention wherein the signal receiving section (1) is implemented as a planar aperture antenna, as well as the re-radiation section (2). Said planar aperture antenna is implemented such that there is between the conductive antenna parts (6) an aperture (7) which opens in the propagation direction of the signal (4 and 5). The figure shows that the opening angle of the aperture (7) changes in the propagation direction of the signal (4 and 5). Between said signal receiving section (1) and the signal re-radiation section (2) there is a signal transmission section (3) realized as two parallel conductor lines (8) between which there is a gap (9). The interfaces between the signal receiving section (1), the signal transmission section (3) and the signal re-radiating section (2) are realized continuously and without separate connections, i.e. they can be manufactured as a single part. The invention works for both directions, i.e. the same device can transmit the signal from either side to the other.

FIG. 2 shows an embodiment of the invention in which the conductive antenna parts (6) are made inside of a dielectric support material (10). The opening (7) between the antenna parts (6) is also filled with dielectric support material (10). In this embodiment, the antenna portions (6) may, for example, be stamped from a thin metal plate and the support material (10) may be, for example, molded cellular foam. The transmission section (3) with the dielectric support material may also be narrower than receiving (1) and re-radiating (2) sections. Such an embodiment can be installed in a narrow slot, for example, in a window frame during the window installation, or can be integrated into a building component already in the construction stage of a building component such as a window.

The lower frequency limit of the broadband operating mode depends mainly on the largest dimension of the antenna opening (7). Below this lower threshold frequency, the narrowband transmission band becomes due to the lowest resonance of the entire antenna structure. If necessary, this resonant frequency band can be lowered by increasing the electrical length of the structure. FIG. 3 shows an embodiment of the invention in which the electrical length of the device is increased by meandering the transmission section (3). This is because the device structure is at a given signal frequency in resonance, whereby it emits to both receiving (4) and transmitting (5) directions.

In the embodiment of the invention shown in FIG. 4, the signal transmission section (3) is bent.

The device according to the invention can be shaped, for example, to fit the window frame.

With the embodiment according to FIG. 5, the signal can be directed to the shadow areas, for example around the corner. The shadow problem becomes more important at shorter wavelengths. The solution is to design the transmission section (3) such that the signal direction (5) after the device is different from the signal direction (4) before the device. The embodiment can be used in built houses, for example, using conducting adhesive label material, or it can be integrated into a building component, for example, a corner collision protection, railing or signboard.

FIG. 6 shows an antenna array consisting of three devices according to the invention. The antenna array may have two or more devices according to the invention. When the devices are mounted vertically as in FIG. 6, the radiation pattern of the antenna array becomes narrower in the vertical plane and the gain increases. The antenna array can be made either on separate support materials (10) or on one and the same support material.

FIG. 7 shows an arrangement in which the devices according to the invention have perpendicular tilt directions. Since a single device only works for radio wave that is polarized in a particular direction, the arrangement can be used to repeat the polarized signal wave in other direction. In the arrangement shown in FIG. 7, the devices are fixed to each other and to the window frame (11), but the devices of the arrangement can be physically located at different locations.

FIG. 8 shows an arrangement in which the devices according to the invention have perpendicular tilt angles and they are connected in the middle to a single support structure (10). The arrangement according to FIG. 8 can be made, for example, for installation or integration into an air-conditioning tube (12) already at the manufacturing stage.

Possible embodiments of the invention are not limited to those described above, but solutions made in different ways and formulated in different ways may be situationally usable and the invention may be modified within the scope of the appended claims. For example, using a thin foil, the device can be shaped very freely and turned to other positions than that shown in the figures.

The invention claimed is:

1. A device for receiving and re-radiating electromagnetic signals, the device comprises a signal receiving section realized as a first planar aperture antenna and a signal re-radiating section realized as a second planar aperture antenna, the signal receiving section and the re-radiating sections is fabricated from two conductive antenna parts such that a first aperture between the two parts opens toward the signal receiving section end and a second aperture between the two parts opens toward the signal re-radiating section end, and a signal transmission section between the receiving and re-radiating sections realized as two parallel conductors connected to the respective two parts and a gap between the conductors, the gap connected to the first and second aperture and without additional conductors in the gap.

2. The device of claim 1, wherein the signal receiving and re-radiating sections are Vivaldi-type antennas and the transitions from the receiving section to the transmission section and from the transmission section to the re-radiating section are realized in a seamless and continuous manner.

3. The device of claim 1, wherein the opening angle of the first aperture in the signal receiving section decreases in the signal propagation direction and the opening angle of the second aperture in the signal re-radiating section increases in the signal propagation direction.

4. The device of claim 1, wherein the device has multiple resonance operation modes, and the signal receiving section and the re-radiating section are on opposite sides of a barrier and the device radiating energy on both sites of the barrier at certain frequency bands.

5. An array for receiving and re-radiating signals, wherein the array comprises two or more of the devices of claim 1, and wherein the signal transmission section is in a meandered form for controlling of resonance mode frequency bands and/or for controlling a phase of a single device in the array.

6. The device of claim 1, the device comprises a support structure comprising a dielectric medium.

7. The device of claim 1, wherein the signal receiving section, signal transmission section and signal re-radiating section are inside of a support structure.

8. The device of claim 1, wherein the device is implemented in a building material.

9. An arrangement for receiving and re-radiating electromagnetic signals, wherein that the arrangement comprises two or more devices of the device of claim 1.

10. The arrangement of claim 9, wherein the devices are placed substantially one on top of the other.

11. The arrangement of claim 9, wherein the devices are placed in different tilt angles with respect to each other.

12. A building component, wherein the component comprises at least one of the device of claim 1.

\* \* \* \* \*